US009274303B2

(12) United States Patent
Mueller et al.

(10) Patent No.: US 9,274,303 B2
(45) Date of Patent: Mar. 1, 2016

(54) ADJUSTING DEVICE FOR AN OPTICAL SYSTEM

(71) Applicant: Carl Zeiss Meditec AG, Jena (DE)

(72) Inventors: Roland Mueller, Aalen (DE); Rupert Demleitner, Heidenheim (DE)

(73) Assignee: Carl Zeiss Meditec AG, Jena (DE)

( * ) Notice: Subject to any disclaimer, the term of this patent is extended or adjusted under 35 U.S.C. 154(b) by 175 days.

(21) Appl. No.: 14/013,698

(22) Filed: Aug. 29, 2013

(65) Prior Publication Data
US 2014/0063627 A1 Mar. 6, 2014

(30) Foreign Application Priority Data

Aug. 29, 2012 (DE) .......................... 10 2012 215 295

(51) Int. Cl.
*G02B 7/02* (2006.01)
(52) U.S. Cl.
CPC ....................................... *G02B 7/023* (2013.01)
(58) Field of Classification Search
USPC ......... 359/811, 813, 815, 819, 822–824, 826; 396/358, 360, 366, 367
See application file for complete search history.

(56) References Cited

U.S. PATENT DOCUMENTS

| 3,533,344 A | 10/1970 | Thomas |
| 4,391,496 A | 7/1983 | Schilling et al. |
| 4,690,519 A | 9/1987 | Clark et al. |
| 4,971,427 A | 11/1990 | Takamura et al. |
| 5,101,269 A | 3/1992 | Shelley et al. |
| 5,333,024 A | 7/1994 | Labaziewicz |
| 6,553,185 B1 | 4/2003 | Inaba et al. |
| 2008/0106811 A1* | 5/2008 | Eromaki ............... G02B 13/009 359/817 |
| 2014/0363131 A1* | 12/2014 | Sabo .................... G02B 6/4257 385/89 |

OTHER PUBLICATIONS

English translation and Office action of the German Patent Office dated Mar. 13, 2013 in German patent application 10 2012 215 295.4 on which the claim of priority is based.

* cited by examiner

*Primary Examiner* — Joseph P Martinez
*Assistant Examiner* — Brandi Thomas
(74) *Attorney, Agent, or Firm* — Walter Ottesen P.A.

(57) ABSTRACT

An adjusting device for an optical system has a first slider for a first optical element, which is arranged displaceably along an axial direction, a second slider for a second optical element, which is arranged displaceably along the axial direction, a control cam contour fixed in relation to the axial direction, a coupler between the first slider, the second slider and the cam contour, and a force element to exert force between the first slider and the second slider, so that the coupler is in contact with the first slider at a first point, is in contact with the second slider at a second point and is in contact with the control cam contour at a third point, the coupler including a first lever arm formed between the first and third points, and the coupler including a second lever arm formed between the second and third points.

20 Claims, 8 Drawing Sheets

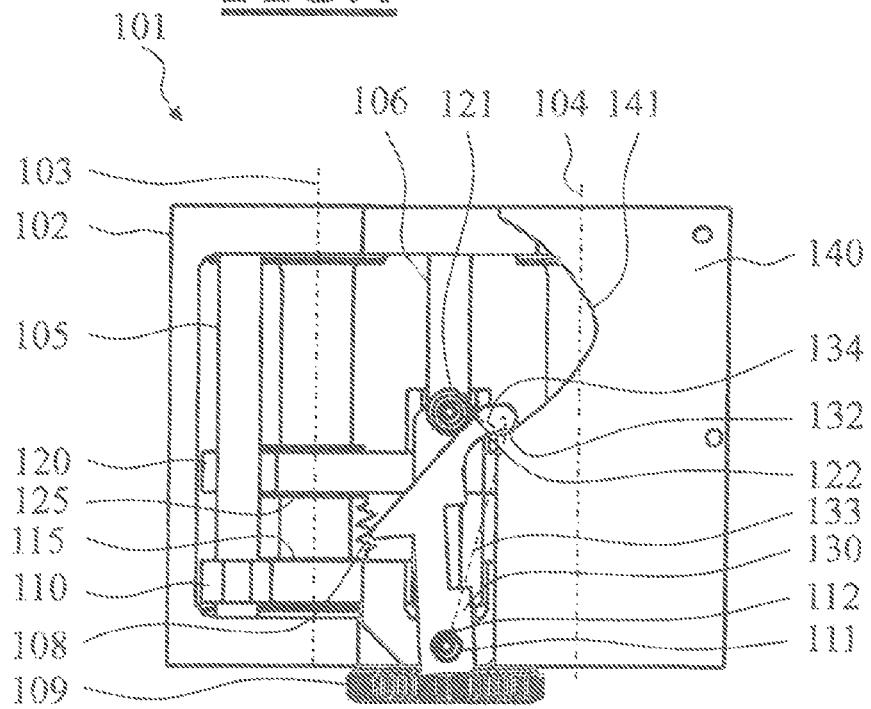
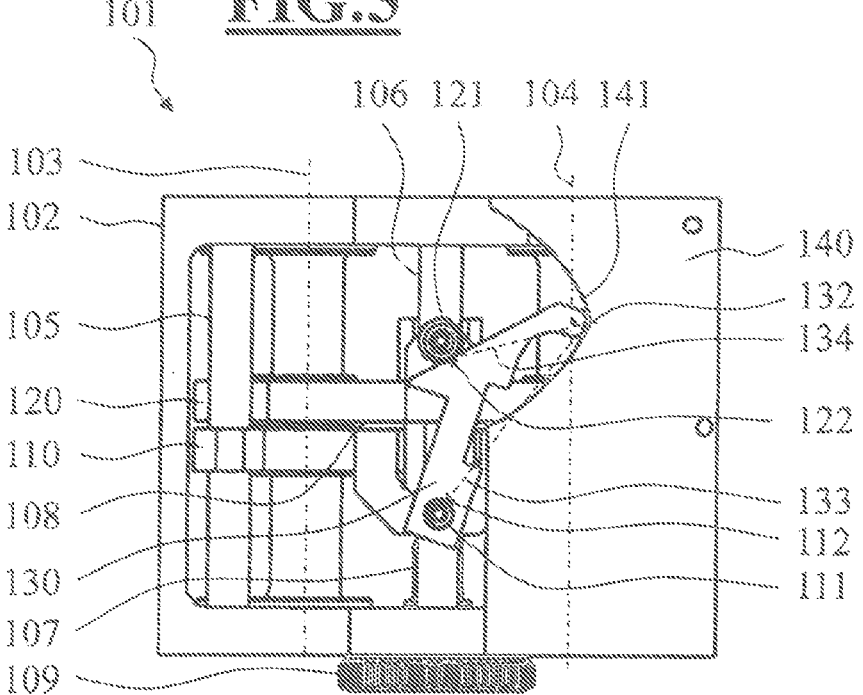

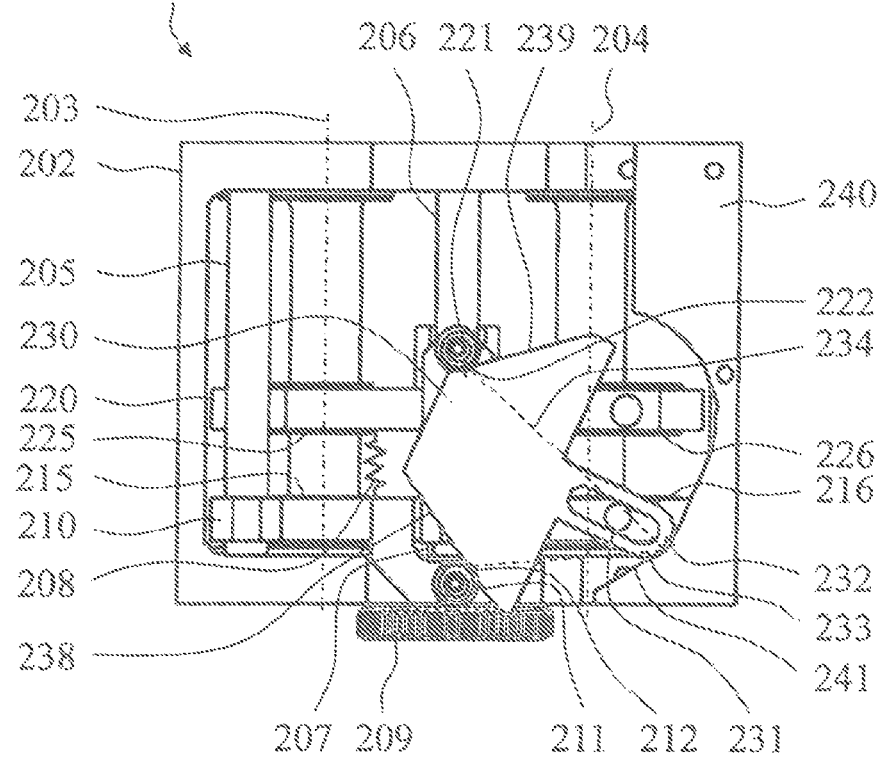
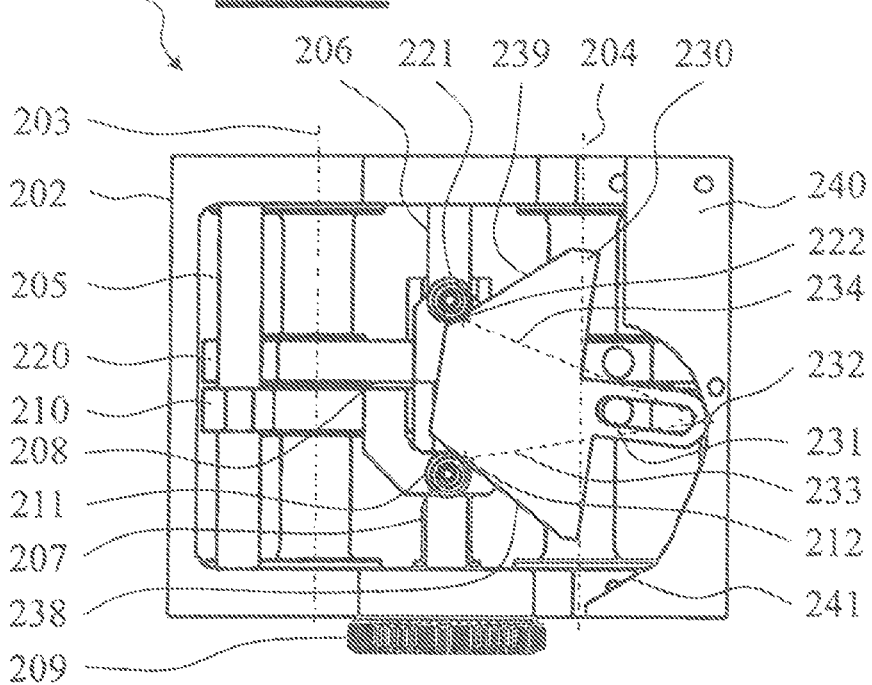

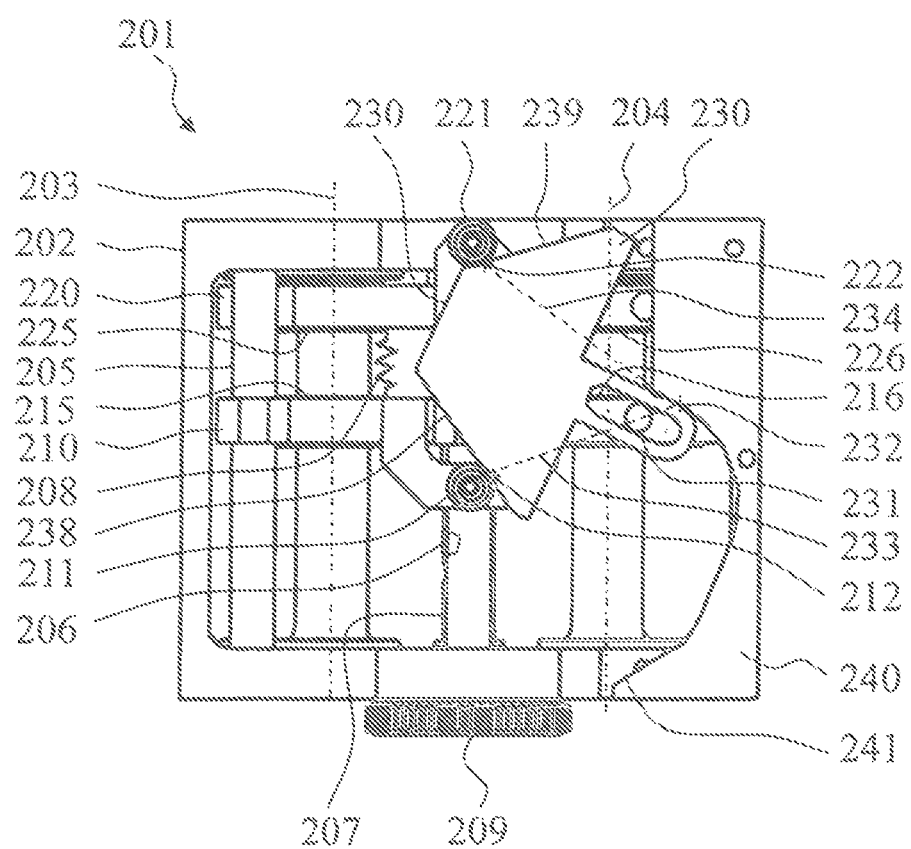

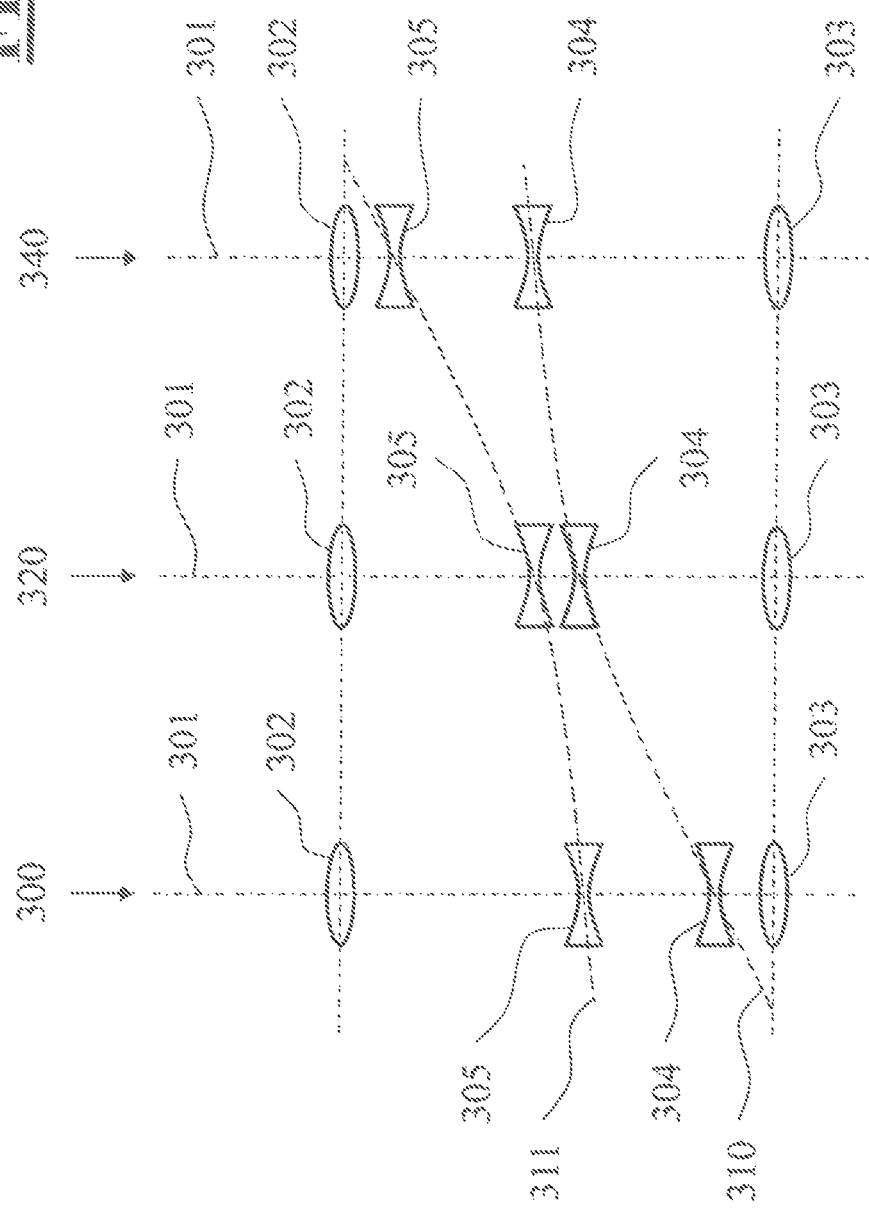

ADJUSTING DEVICE FOR AN OPTICAL SYSTEM

CROSS REFERENCE TO RELATED APPLICATION

This application claims priority of German patent application no. 10 2012 215 295.4, filed Aug. 29, 2012, the entire content of which is incorporated herein by reference.

FIELD OF THE INVENTION

The invention relates to an adjusting device for an optical system and has: a first slide element for a first optical element, which is arranged displaceably along an axial direction, a second slide element for a second optical element, which is arranged displaceably along the axial direction, and a control cam contour, which is arranged fixed in place in relation to the axial direction. The invention additionally comprises a coupling element, which is arranged between the first slide element, the second slide element and the control cam contour, and a force element, which exerts a force between the first slide element and the second slide element, so that the coupling element is in contact with the first slide element at a first point, is in contact with the second slide element at a second point and is in contact with the control cam contour at a third point, the coupling element comprising a first lever arm, which is formed between the first point and the third point, and the coupling element comprising a second lever arm, which is formed between the second point and the third point.

BACKGROUND OF THE INVENTION

Optical systems often comprise mechanically moved optical elements or assemblies of optical elements. These are typically zoom devices or focussing devices. At least one optical element is in this case guided along a predetermined path of movement between two end positions. For example, the movement of a first optical element may take place along an axis in a non-linear way, while the movement of the second optical element has a different movement sequence in relation to the position of the first optical element. A non-linear movement sequence of the optical elements often arises from the necessity of adapting the focal length and the depth of field of the optical system to an observing situation.

U.S. Pat. No. 4,391,496 discloses an adjusting device for a pancratic objective of a stereo microscope with two lens elements that are displaceable in relation to one another along the optical axis. The adjusting device has a first slide element for a first lens element and a second slide element for a second lens element. The slide element is referred to in this document as a support. The first slide element can be displaced by means of a handle. Arranged between the first slide element and the second slide element is a coupling element, which is referred to in the document as a hinge element. The coupling element is in engagement with a control cam. The coupling element consists of a toggle lever, which is respectively supported by one leg on one of the slide elements that are pretensioned against one another by spring force and is supported by its folding location on the fixed-in-place control cam by way of a wheel that is rotatable about a folding axis.

This device has the disadvantage that a number of components are necessary for the coupling element, to be specific two legs and a rotatable wheel. In particular in the case of very small optical systems, this involves increased production and assembly costs. Moreover, in certain positions great forces must be expected in the toggle lever and on the control cam. For example, to achieve a short distance between the two slide elements, a small enclosed angle is necessary at the folding location between the two legs. Since the folding location is supported on the control cam, this leads to great forces in this region, in particular to great forces within the two legs and on the bearing devices of the two legs. If the device is moved from one operating state into another operating state, this involves unfavorable force conditions of the forces that are transferred from the first slide element to the second slide element, since the transfer of the forces that act in the axial direction from the first slide element to the second slide element also takes place by way of the legs of the toggle lever. The unfavorable force conditions necessitate the use of a strong spring in order to connect the second slide element to the first slide element by way of the coupling element reliably and without play.

SUMMARY OF THE INVENTION

It is therefore an object of the invention to provide an adjusting device for an optical system that is easy to produce and makes a favorable transfer of forces possible between the slide elements and a coupling element.

According to the invention, the object is achieved by the adjusting device being configured in such a way that, when there is a movement of the coupling element, the first lever arm and/or the second lever arm is variable in length.

Two optical elements, which may comprise optical lenses or groups of optical lenses, are intended to be moved in relation to one another along an axial direction. For this purpose, the optical elements are respectively arranged on a first slide element and a second slide element. A control cam contour is provided fixed in place with respect to the axial direction.

Arranged between the first slide element, the second slide element and the control cam contour is a coupling element, which is held in a defined position with the aid of the force element. In this case, the coupling element is in contact with the first slide element at a first point, is in contact with the second slide element at a second point and is in contact with the control cam contour at a third point. When there is a movement of the first slide element along the axial direction, the coupling element is inevitably taken along, sliding or rolling on the control cam contour. The movement of the coupling element is thereby transferred to the second slide element. This produces a defined position of all the elements in various operating states of the adjusting device.

In this document, the positions of all the individual elements of the adjusting device in their entirety in a specific, functionally effective state is defined as an operating state of the adjusting device. Individual elements are understood as meaning, for example, the first slide element, the second slide element and the optical elements provided thereon, the coupling element, the force element, and the additional elements provided on the individual elements mentioned, for example bearing devices, pins and connecting elements. A position of an individual element that is assigned to an operating state of the adjusting device is defined in this connection as a working position. The operating state of the adjusting device is consequently also the sum of the working positions of the individual elements. If, for example, the optical system is a zoom system, an operating state corresponds to a specific zoom setting.

In this document, the region between the two elements that is produced by the contact between these two elements is defined as the contact region. The contact region may be a point, a line or an area. In each working position, at least a first point between the first slide element and the coupling element, a second point between the second slide element and the coupling element and a third point between the coupling element and the control cam contour are obtained as the contact region of two elements. If a line is obtained as the contact region between two contacting elements, the first point, the second point or the third point may also be a contact point on this line. The contact region has at least one point, but the structural design and/or the material may dictate that it is a circular, oval, rectangular or any desired form of area.

Forces are transferred by way of the first point, the second point and the third point. Force vectors can be calculated for each of the three points. The force vectors at the first point and second point display a component along the axial direction or direction of displacement of the two slide elements, and a component that runs orthogonally thereto, that is, in the direction of the fixed-in-place control cam contour. As a result, the coupling element undergoes a force in the direction of the control cam contour and it is ensured that the coupling element is in contact with the control cam contour at the third point in every working position.

A change in position of the coupling element leads to a change in the working position of the second slide element. This involves a setting of the relative distance, defined by this working position, between the first slide element and the second slide element. As a result, the adjusting device is transferred into another operating state.

The distance between the first point and the third point is defined as a first lever arm. The distance between the second point and the third point is defined as a second lever arm. For each operating state, the force conditions in these two lever arms can be calculated. When there is a change in the operating state or in a movement of the coupling element, the length of the first lever arm and/or of the second lever arm is variable. A change in the length of one lever arm or both lever arms when the adjusting device moves into another operating state thus allows the transfer of force from the first slide element to the second slide element by way of the coupling element and the control cam contour to be favorably influenced. The favorable force conditions result in a smoothly operating, long-lasting and low-wearing adjusting device that is easy to assemble and easy to produce. This adjusting device is particularly suitable for very small optical zooming and focusing devices.

In one configuration, contours of the first slide element, of the second slide element, of the coupling element and of the control cam contour are made to match one another in such a way that a movement resistance between the coupling element and the control cam contour is greater than the sum of the movement resistances between the first slide element and the coupling element and between the second slide element and the coupling element, so that when there is a movement the coupling element rolls along the control cam contour.

The coupling element is in contact with the two slide elements at a first point and a second point and is in contact with the control cam contour at a third point. In the case of an embodiment of the coupling element with round contours, for example, the coupling element may perform a rotary movement in addition to translatory movements when there is a change in the working position. Rolling of the coupling element on the control cam contour is achieved if a resultant tangential force acting on the coupling element is great enough to overcome a movement resistance, that is, the force opposing a movement. To achieve a defined movement of the coupling element, the force opposing a movement in the tangential direction at the third point between the coupling element and the control cam contour should be greater than the sum of the movement resistances in the tangential direction at the first point and the second point between the two slide elements and the coupling element.

This can be achieved by suitable measures bringing about increased friction generally in the contact region between the control cam contour and the coupling element, for example by dispensing with a lubricant, roughening of the surface or some other surface treatment. The contact region may be increased in size, for example to a circular, oval or rectangular area. The frictional forces at the contact regions at which contact occurs between the slide elements and the coupling element may be minimized, for example by suitable lubrication, smooth surfaces or an optimum surface design with a very small punctiform contact region. This measure allows the coupling element to roll reliably on the control cam contour when there is a movement of a slide element.

In a further configuration, the first slide element has a first bearing device, which is formed in such a way that the first slide element is in contact with the coupling element at the first point by way of the first bearing device.

If an additional bearing device, for example a sliding bearing, a ball bearing or a rolling bearing, is introduced between the first slide element and the coupling element, the movement resistance between the first slide element and the coupling element becomes very small. This low-friction bearing device consequently allows a reduction in the movement resistance between the first slide element and the coupling element to be advantageously achieved, which leads to an improved rolling process of the coupling element on the control cam contour.

In a further configuration, the second slide element has a second bearing device, which is formed in such a way that the second slide element is in contact with the coupling element at the second point by way of the second bearing device.

If an additional bearing device, for example a sliding bearing, a ball bearing or a rolling bearing, is introduced between the second slide element and the coupling element, the movement resistance between the second slide element and the coupling element becomes very small. This low-friction bearing device consequently allows a reduction in the movement resistance between the second slide element and the coupling element to be advantageously achieved, which leads to an improved rolling process of the coupling element on the control cam contour.

These bearing devices may also be advantageously arranged between the first slide element and the coupling element and between the second slide element and the coupling element. These two bearing devices allow the coupling element to roll reliably on the control cam contour when there is a movement of a slide element. The reduction in the friction of the overall system brought about by using at least one bearing device improves the mechanical running properties of the adjusting device as a whole.

In a further configuration, the coupling element is embodied as one part.

A one-part embodiment of the coupling element results in favorable production costs, low stockkeeping costs and inexpensive assembly. A one-part embodiment has the effect of reducing play that would otherwise occur as a result of the use of a number of interconnected components that would together form a coupling element. Various points of force application of the one-part coupling element in the various operating states allow favorable lever ratios, and consequently a particularly favorable force transfer, to be achieved for the adjusting device. A one-part embodiment of the coupling element is particularly favorable in the case of very small adjusting devices.

In a further configuration, the coupling element has at least partially a round contour area, which is configured in such a way that the coupling element is in contact with the first slide element at the first point by way of the contour area and is in contact with the second slide element at the second point by way of the contour area in all operating states of the adjusting device.

If the coupling element has a round form at the contour areas at which a contact region in relation to the two slide elements can be formed, the form of the coupling element can be made simple. In the simplest case, the coupling element is formed as completely round or circular. The round form of the coupling element produces a stable state in all operating positions. When there is unwanted rotation of the coupling element about its own axis, the effects on the function of the adjusting device are very small and, if they occur at all, are caused by production tolerances of the coupling element. Furthermore, the force conditions at all three points with which the coupling element is in contact with the slide elements and the control cam contour are the same. The round form of the coupling element gives rise to a favorable method of production as a turned part. The calculation of the adjusting device is relatively simple.

In a further configuration, the adjusting device has a toothed connection by which the coupling element is in connection with the control cam contour.

The use of a toothed connection in the contact region between the control cam contour and the coupling element has the effect of reliably preventing unwanted turning or displacement of the coupling element in this region. As a result, an exactly defined positional relationship between the control cam contour and the coupling element is predetermined in every operating state of the adjusting device with any desired form of coupling element.

In a further configuration, the coupling element is connected to the first slide element by way of a rotary joint, the first point being formed by the rotary joint.

In this case, the first point between this slide element and the coupling element is defined in the rotary joint. In this configurational form too, the coupling element is still supported on the control cam contour, and similarly a second point that is different in different operating states of the adjusting device is obtained as a contact point between the second slide element and the coupling element. When there is a change in position of a slide element, depending on the control cam contour, the coupling element performs a rotary movement about the rotary point of the rotary joint in addition to a translatory movement. Depending on the form of the control cam contour and the contour of the coupling element in the contact region in relation to the second slide element, a position in relation to the position of the first slide element is established for the second slide element.

The mounting of the coupling element on a slide element has the effect of reducing the number of rotary degrees of freedom of the coupling element and of reliably preventing unwanted changing of the angle of the coupling element during operation. This allows other paths of movement for the coupling element and other forms of the control cam contour to be defined. New design possibilities are consequently also obtained for the form of the coupling element. This element can be made relatively narrow. This embodiment can be advantageously used in the case of adjusting devices with confined space conditions.

In a further configuration, the coupling element and the first slide element are connected to one another by way of a joint with a translatory degree of freedom.

A reduction of the rotary degrees of freedom of the coupling element takes place by the coupling element being connected to a slide element by way of a joint with a translatory degree of freedom. This produces in addition to the three points at which the coupling element contacts the two slide elements and the control cam contour an additional fourth point, which is obtained by the contact between the first slide element and the coupling element. The adding of an additional joint with a translatory degree of freedom has the effect that the coupling element is in a defined position in every working position and performs a defined movement when there is a change in the working position.

In a further configuration, the joint is configured as a slotted link.

In one configuration, the coupling element has a groove, a slit or a web, in which a link element that is provided on a slide element is forcibly guided. Alternatively, the link element may be provided on the coupling element and the slide element may have a groove, slit or web. The configuration of the joint as a slotted link has the advantage that it can be produced favorably and simply.

Production tolerances of the slotted link only have an effect on the accuracy of the adjusting device to a slight extent.

In a further configuration, the coupling element has at least one straight abutting contour, so that the coupling element is in contact on the straight abutting contour with the first slide element at the first point in all operating states of the adjusting device.

Inexpensive production of the coupling element can be achieved by a form that is simple to produce. High accuracy is only necessary in the regions in which the coupling element is in contact with the two slide elements or the control cam contour in the various operating states. If the coupling element has a straight outer edge at one of these locations, this outer edge can be produced, and checked, in a simple manner. This results in production of the coupling element that is favorable as a whole.

In a further configuration, the force element is formed as a tension spring.

Selection of a suitable tension spring allows the tensile force of the correct amount necessary to be easily provided, so that the adjusting device functions reliably with the least possible exertion of force. The use of a tension spring as a force element is inexpensive.

BRIEF DESCRIPTION OF THE DRAWINGS

The invention will now be described with reference to the drawings wherein:

FIG. 4 shows a second embodiment of the adjusting device according to the invention in a first operating state;

FIG. 5 shows a second embodiment of the adjusting device according to the invention in a second operating state;

FIG. 7 shows a third embodiment of the adjusting device according to the invention in a first operating state;

FIG. 8 shows the third embodiment of the adjusting device according to the invention in a second operating state;

FIG. 9 shows the third embodiment of the adjusting device according to the invention in a third operating state;

FIG. 10 shows a schematic representation of the optical elements in three operating states; and, FIG. 11 is a schematic showing a toothed connection for connecting a coupling element to a control cam element.

DESCRIPTION OF THE PREFERRED EMBODIMENTS OF THE INVENTION

Figure 1:
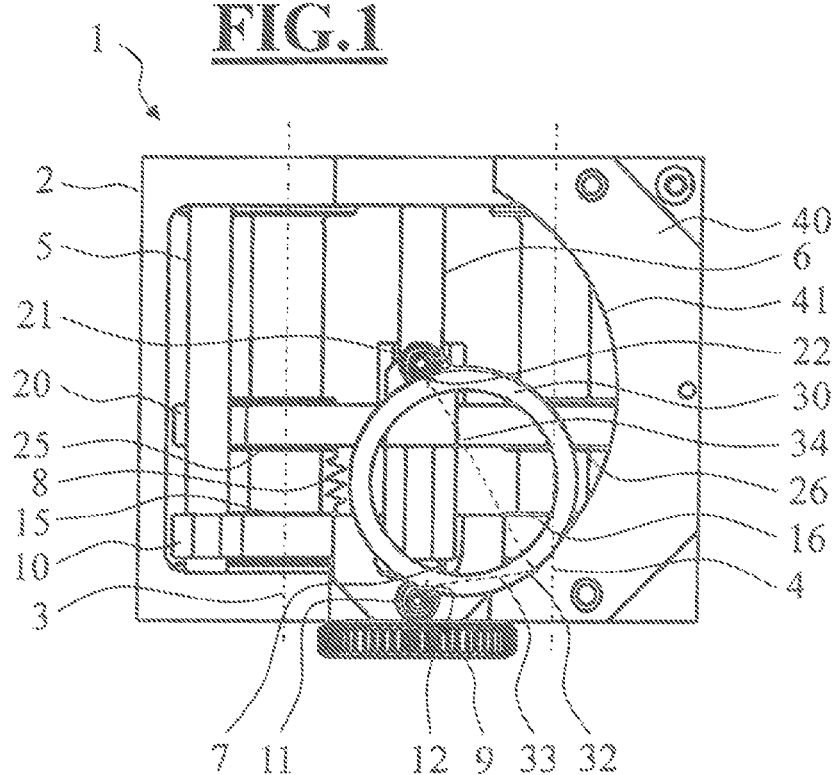
FIG. 1 shows a first embodiment of an adjusting device according to the invention in a first operating state.

The reference numerals mentioned in the figures apply generally to more than one figure. The same reference numerals thereby respectively refer to the same elements in each of the embodiments.

In FIG. 1, a first embodiment of the adjusting device according to the invention is represented in a first operating state.

An optical device 1 is embodied here as a zoom-setting device for a stereoscopic observing apparatus. The optical device 1 comprises a housing 2, in which a first guiding element 5 and, parallel thereto, a second guiding element 6 are assembled. Both guiding elements (5, 6) are embodied as guiding rods. The guiding elements (5, 6) run along an axial direction, which in this embodiment runs parallel to a first optical axis 3 of a first stereo channel. Arranged parallel to the first optical axis 3 of the first stereo channel is a second optical axis 4 of a second stereo channel. Mounted displaceably on the guiding elements (5, 6) in the direction of the two optical axes (3, 4) are a first slide element 10 and a second slide element 20. On the first slide element 10, a first optical element 15 is provided on the first optical axis 3 and a second optical element 16 is provided on the second optical axis 4. On the second slide element 20, a third optical element 25 is provided on the first optical axis 3 and a fourth optical element 26 is provided on the second optical axis 4. The slide element 10 is additionally connected to a setting wheel 9 by way of a drive rod 7, for example, by thread engagement. Turning of the setting wheel 9 brings about turning of the drive rod 7. Turning of the drive rod 7 leads to a change in the working position of the first slide element 10 in the direction of the optical axes (3, 4). Consequently, the working position of the first slide element 10 in the axial direction can be set by way of the setting wheel 9.

A control cam element 40 is connected to the housing 2 in such a way that it is fixed in place. The control cam element 40 has a control cam contour 41 with respect to the two optical axes (3, 4). Provided on the first slide element 10 is a first bearing in the form of a first ball bearing 11 and provided on the second slide element 20 is a second bearing in the form of a second ball bearing 21. Between the first ball bearing 11, the second ball bearing 21 and the control cam contour 41 there is a coupling element 30. The coupling element 30 has a circular form and in this embodiment is configured as a ring. A force element, for example a tension spring 8, brings about a tensile force between the second slide element 20 and the first slide element 10. In this case, the coupling element 30, which is guided in an engaging recess of the two ball bearings (11, 21), is pressed against the control cam contour 41 without play. A first point 12 is produced as a contact point between the first ball bearing 11 and the coupling element 30. A second point 22 is formed as a contact point between the second ball bearing 21 and the coupling element 30 and a third point 32 is formed as a contact point between the control cam contour 41 and the coupling element 30. The coupling element 30 has a first lever arm 33 between the first point 12 and the third point 32 and a second lever arm 34 between the second point 22 and the third point 32.

In FIG. 1, the optical adjusting device 1 is shown in a first operating state. The slide element 10 is here in a first working position, which may also be referred to here as the first end position, since the slide element 10 is against an end stop in relation to the housing 2. The position of the coupling element 30 is defined by the control cam contour 41 and the first ball bearing 11. Depending on the position of the coupling element 30, a first relative distance in relation to the first slide element 10 is established for the first ball bearing 21 and the second slide element 21 connected thereto. Consequently, the first optical element 15 and the third optical element 25 as well as the second optical element 16 and the fourth optical element 26 are in a first zoom setting.

Figure 2:
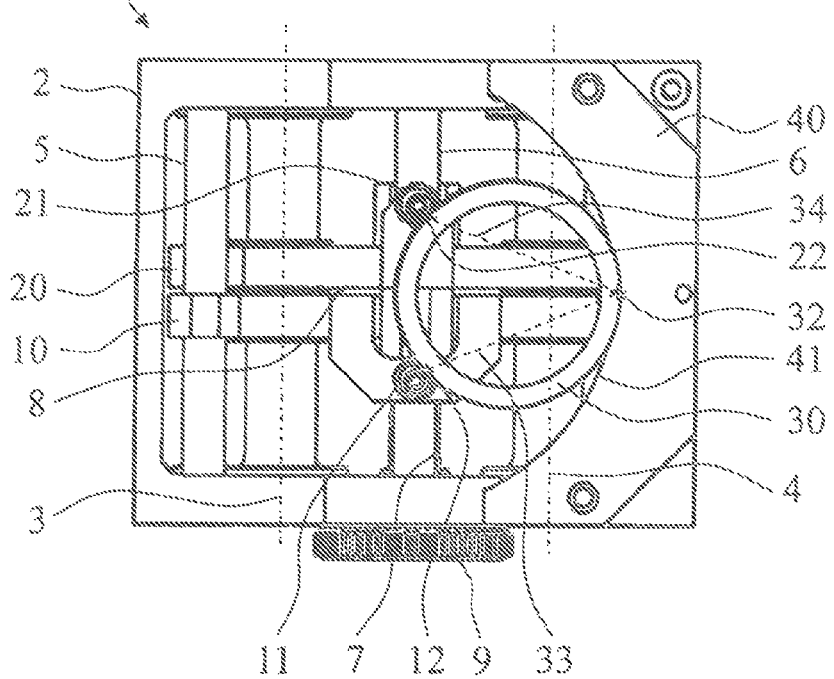
FIG. 2 shows the first embodiment of the adjusting device according to the invention in a second operating state.

In FIG. 2, the first embodiment of the adjusting device according to the invention is shown in a second operating state.

The slide element 10 here is disposed in a midway position between the two end positions. The position of the coupling element 30 is defined by the form of the control cam contour 41 and the position of the first ball bearing 11 provided on the first slide element 10. The tension spring 8 (not shown here) has the effect that the second slide element 20 with the second ball bearing 21 is drawn to the coupling element 30. As a result, a second relative distance between the first slide element 10 and the second slide element 20 is set. The first optical element 15 and the third optical element 25 as well as the second optical element 16 and the fourth optical element 26 are consequently in a second zoom setting. This second zoom setting corresponds to a second operating state of the optical device 1.

Figure 3:
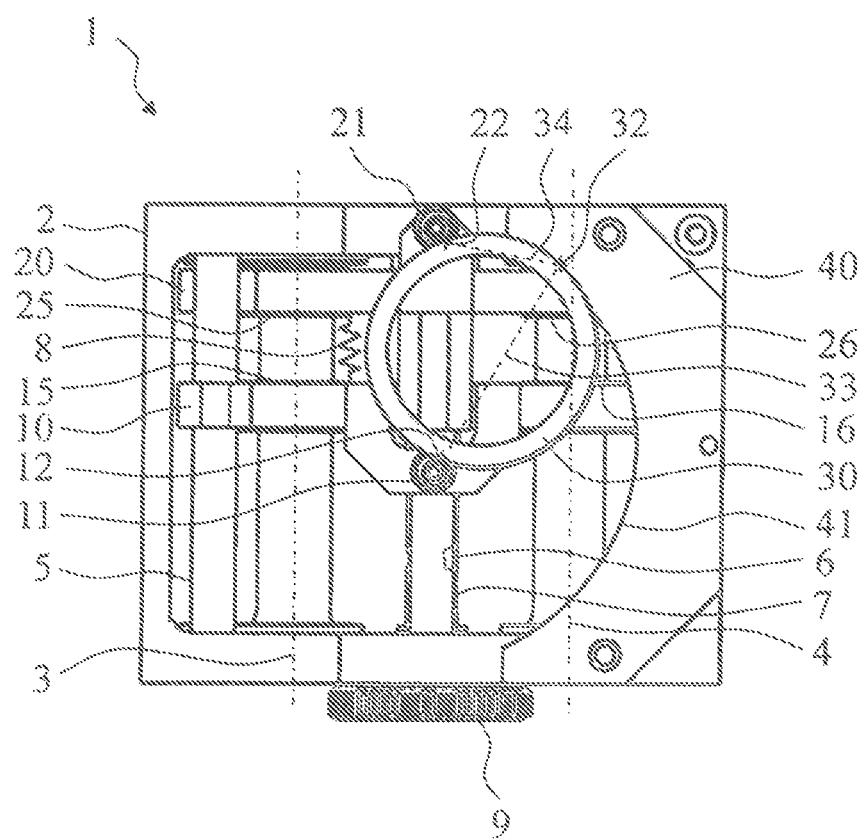
FIG. 3 shows the first embodiment of the adjusting device according to the invention in a third operating state.

In FIG. 3, the first embodiment of the adjusting device according to the invention is shown in a third operating state.

As a result of the control cam contour 41, a third relative distance is set between the first slide element 10 and the second slide element 20 by way of the ball bearings (11, 21) and the coupling element 30. The second slide element 20 is here in a second end position. The first optical element 15 and the third optical element 25 as well as the second optical element 16 and the fourth optical element 26 are consequently in a third zoom setting. This third zoom setting corresponds to a third operating state of the optical device 1.

In FIGS. 1, 2 and 3, the two lever arms (33, 34) are depicted as respective dashed lines. FIGS. 1 to 3 show the changes in the lengths of the first lever arm 33 and the second lever arm 34 in three different operating states of the optical adjusting device 1.

In the first operating state shown in FIG. 1, the first lever arm 33 corresponds in its length approximately to the radius of the coupling element 30, while the second lever arm 34 is formed almost twice as long in relation to the first lever arm 33. In the second operating state, shown in FIG. 2, the two lever atlas (33, 34) are formed approximately of the same length. However, in this second operating state, both lever arms (33, 34) are shorter than the second lever arm 34 and longer than the first lever arm 33 in the first operating state according to FIG. 1. A movement of the optical adjusting device 1 from the first operating state into the second operating state has the result that the first lever arm 33 is extended in length and the second lever arm 34 is shortened. During the movement of the optical adjusting device 1 from the first operating state into the second operating state, the change in the length of the two lever arms (33, 34) takes place in a non-linear way.

In FIG. 3, a third operating state is represented. In the third operating state, the first lever arm 33 is formed almost twice as long in relation to the second lever arm 34. During a movement of the optical adjusting device 1 from the second operating state into the third operating state, the first lever arm 33 is extended in length and the second lever arm 34 is shortened. The change in the length of the two lever arms (33, 34) is non-linear. In the case of a reversal of the direction of movement from the third operating state into the second operating state and from the second operating state into the first operating state, the changes in the length of the two lever arms (33, 34) are inverted.

In this embodiment, the drive of the first slide element 10 takes place by way of the drive rod 7 and the setting wheel 9. Alternatively, however, the drive may also take place on the second slide element 20. The drive of the first slide element 10 or the drive of the second slide element 20 are equivalent. The drive rod 7 may, for example, comprise a threaded spindle or it may be embodied in such a way that a pin provided on the slide element 10 is guided in a groove milled into the drive rod. Similarly, it is conceivable for the drive to be provided by a lever or a traction cable. The drive may in this case takes place both manually, by way of the setting wheel 10, and in a motorized manner.

The one-part coupling element 30 may be reliably secured against falling out by structural design measures, for example by a groove introduced into the coupling element 30 in the contact region between the coupling element 30 and the control cam contour 41 and in the contact region between the coupling element 30 and the two ball bearings (11, 21).

If the round coupling element 30 is deflected out of a working position, for example by an unwanted rotational movement about its own axis, this does not have any effect on the function or the distribution of forces in all of the operating states of the optical adjusting device 1.

The tension spring 8 may alternatively also be formed as a rubber tension device. It is similarly conceivable to realize a force element by magnets. In a further configurational form, the tension spring 8 may also be replaced by two compression springs, a first compression spring being provided between the housing 2 and the first slide element 10 and a second compression spring being provided between the housing 2 and the second slide element 20. The two compression springs thus press the coupling element against the control cam contour 41 without play.

One or both ball bearings (11, 21) may also be replaced by other rolling bearings or sliding bearings. It is also conceivable to dispense with a bearing device entirely. In this case, it may be provided to apply friction-minimizing substances, for example oil or silicone oil, to the contact areas or sliding areas between the two slide elements (10, 20) and the coupling element 30.

In an alternative embodiment, the coupling element 30 may also have a toothed connection, by which the coupling element 30 is in connection with the control cam contour 41. The toothed connection may be configured in such a way that the control cam contour 41 has a surface structure with one or more teeth, which is in engagement with a corresponding toothed structure of the coupling element 30.

The structure of one or more tooth elements may, for example, be counted additively with the form of the control cam contour 41, so that constructively a new resultant control cam contour 41 is obtained. In this case, the coupling element 30 has in the contact region in relation to the control cam contour 41 an appropriately corresponding toothed structure. In addition, with a toothed connection, it may be possible under certain circumstances to dispense with the use of bearing devices (11, 21) between the first slide element 10 and the coupling element 30 as well as between the second slide element 20 and the coupling element 30 as a result of the increased friction and the precisely defined position in the contact region between the coupling element 30 and the control cam contour 41 in every operating state. In particular, the coupling element 30 may also have a form deviating from the form of a circle, since a defined position of the coupling element 30 is ensured in every working position by the toothed connection between the coupling element 30 and the control cam contour 41.

Figure 11:
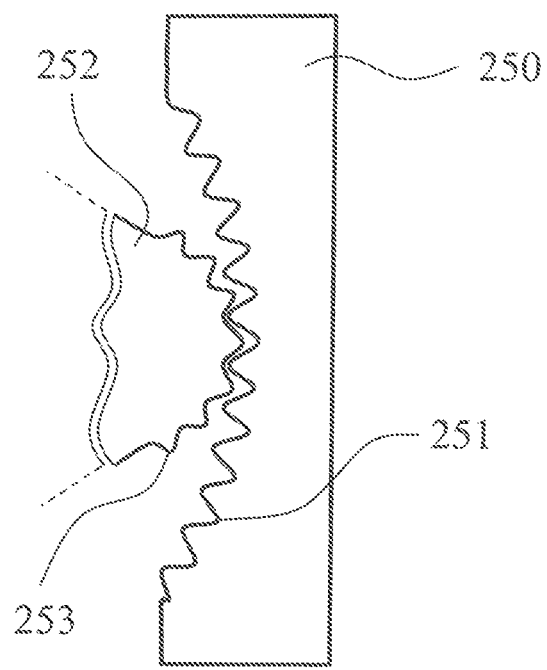

FIG. 11 shows a toothed connection for connecting the coupling element to the control cam. A control cam element 250 has a toothed control cam contour 251. A coupling element 252 has a toothed cam contour 253 which meshes into the toothed control cam contour 251. The coupling element 252 can carry out a roll-off movement along the toothed cam contour 253. An advantage here is that the coupling element 252 can depart from a circular configuration and be disposed in each instant in a precisely defined relative position with respect to the toothed control cam contour 251.

In FIG. 4, a second embodiment of the adjusting device according to the invention is shown in a first operating state.

An optical device 101 is embodied as a zoom-setting device for a stereoscopic observing unit. The optical device 101 comprises a housing 102, in which a first guiding element 105 and a second guiding element 106 are mounted. The guiding elements (105, 106) run along an axial direction, which in this embodiment runs parallel to a first optical axis 103 of a first stereo channel. Arranged parallel to the first optical axis 103 of the first stereo channel is a second optical axis 104 of a second stereo channel. Mounted displaceably on the guiding elements (105, 106) in the direction of the two optical axes (103, 104) are a first slide element 110 and a second slide element 120. On the first slide element 110, a first optical element 115 is provided on the first optical axis 103 and a second optical element (not shown) is provided on the second optical axis 104. On the second slide element 120, a third optical element 125 is provided on the first optical axis 3 and a fourth optical element (not shown) is provided on the second optical axis 4. The slide element 110 is additionally connected to a setting wheel 109 by way of a drive rod 107 (not shown), for example by thread engagement. Turning of the setting wheel 109 brings about turning of the drive rod 107. Turning of the drive rod 107 leads to a change in the working position of the first slide element 110 in the direction of the optical axes (103, 104). Consequently, the working position of the first slide element 110 in the axial direction can be set by way of the setting wheel 109.

A control cam element 140 is connected to the housing 102 in such a way that it is fixed in place. The control cam element 140 has a control cam contour 141 with respect to the two optical axes (103, 104). The first slide element 110 is connected to a coupling element 130 by way of a bearing device 111. This bearing device 111 may be embodied as a sliding bearing or generally as a rolling bearing, with preference as a ball bearing. The coupling element 130 has a rotational degree of freedom about the center point of the bearing device 111.

A force element, for example a tension spring 108, brings about a tensile force between the second slide element 120 and the first slide element 110. A bearing 121 is provided on the second slide element 120. The bearing 121 may be embodied as a sliding bearing or generally as a rolling bearing, with preference as a ball bearing. The coupling element 130 mounted by the bearing device 111 is pressed by the bearing 121 against the control cam contour 141 without play. A first point 112 is produced as a contact point between the bearing device 111 and the coupling element 130. A second point 122 is formed as a contact point between the bearing 121 and the coupling element 130 and a third point 132 is formed as a contact point between the control cam contour 141 and the coupling element 130. The coupling element 130 has a first lever arm 133 between the first point 112 and the third point 132 and a second lever arm 134 between the second point 122 and the third point 132.

In FIG. 4, the optical adjusting device 101 according to the second embodiment is shown in a first operating state. The slide element 110 is in this state in a first working position, which may also be referred to here as a first end position, since the slide element 110 is against the end stop in relation to the housing 102. The position of the coupling element 130 is defined by the control cam contour 141 and the bearing device 111. Depending on the position of the coupling element 130, a first relative distance in relation to the first slide element 110 is established for the bearing 121 and the second slide element 120 connected thereto. As a result, the first optical element 115 and the third optical element 125 as well as the second optical element (not shown) and the fourth optical element (not shown) are in a first zoom setting.

In FIG. 5, the second embodiment of the adjusting device according to the invention is shown in a second operating state.

The slide element 110 is in this state arranged in a midway position between the two end positions. The position of the coupling element 130 is defined by the form of the control cam contour 141 and the position of the bearing device 111 provided on the slide element 110. The tension spring 108 (not shown in FIG. 5) has the effect that the second slide element 120 with the bearing 121 is drawn to the coupling element 130. As a result, a second relative distance between the first slide element 110 and the second slide element 120 is set. The first optical element 115 and the third optical element 125 as well as the second optical element (not represented) and the fourth optical element are in a second zoom setting. This second zoom setting corresponds to a second operating state of the optical device 101.

Figure 6:
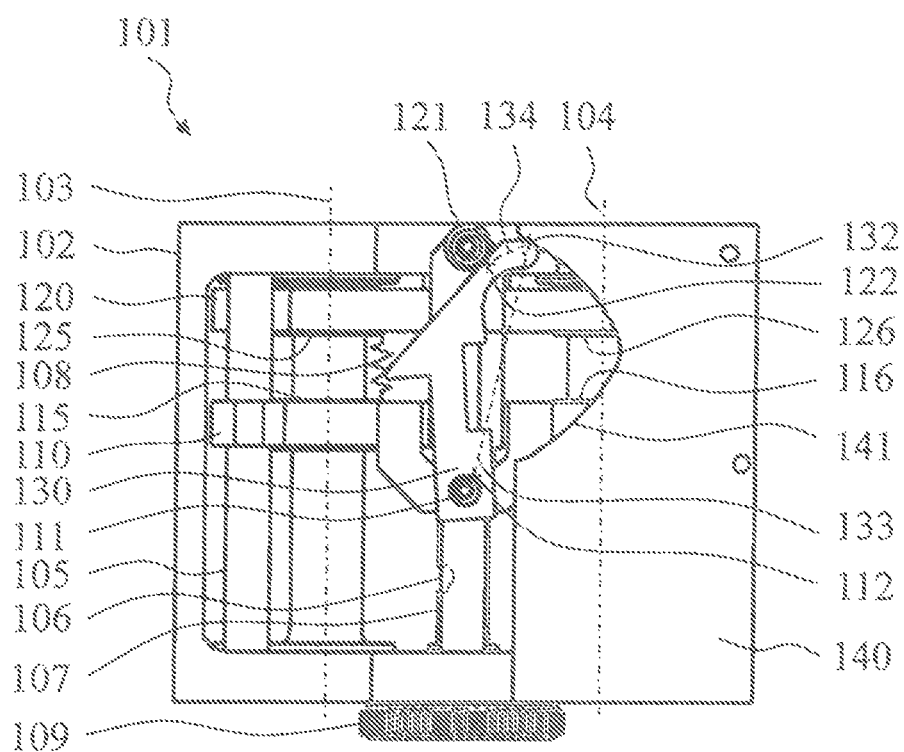
FIG. 6 shows a second embodiment of the adjusting device according to the invention in a third operating state.

In FIG. 6, the second embodiment of the adjusting device according to the invention is shown in a third operating state.

As a result of the control cam contour 141, a third relative distance is established between the first slide element 110, and the coupling element 130 connected thereto by way of the bearing device 111, and the second slide element 120 by way of the bearing 121. The slide element 120 is in a second end position. The first optical element 115 and the third optical element 125 as well as the second optical element (not represented) and the fourth optical element are consequently in a third zoom setting. This third zoom setting corresponds to the third operating state of the optical device 101.

In FIGS. 4, 5 and 6, the two lever arms (133, 134) are depicted as dashed lines in each of these figures. FIGS. 4 to 6 show the changes in the lengths of the first lever arm 133 and the second lever arm 134 in three different operating states of the optical adjusting device 101.

In the first operating state, shown in FIG. 4, the first lever arm 133 is formed as relatively long. The length of the first lever arm 133 corresponds approximately to the distance between the center point of the bearing device 111 and the center point of the bearing 121. The second lever arm 134 is formed as relatively short in relation to the first lever arm. In this embodiment, the length of the second lever arm 134 corresponds to approximately one third of the length of the first lever arm 133.

In the second operating state, shown in FIG. 5, the first lever arm 133 is longer in relation to its length by a small amount than in the first operating state according to FIG. 4. The second lever arm 134 is almost twice as long in the second operating state as in the first operating state. A movement of the optical adjusting device 101 from the first operating state into the second operating state has the result that the first lever arm 133 and the second lever arm 134 are extended in length. During the movement of the optical adjusting device 101 from the first operating state into the second operating state, the change in the length of the two lever arms (133, 134) takes place in a non-linear way.

In FIG. 6, a third operating state is shown. In the third operating state, the length of the second lever arm 134 corresponds approximately to one quarter of the length of the first lever arm. During a movement of the optical adjusting device 1 from the second operating state into the third operating state, the first lever arm 133 is extended in length by a small amount and the second lever arm 134 is shortened. The change in the length of the two lever arms (133, 134) is non-linear. In the case of a reversal of the direction of movement from the third operating state into the second operating state and from the second operating state into the first operating state, the changes in the length of the two lever arms (33, 34) are inverted.

In FIG. 7, a third embodiment of the adjusting device according to the invention is shown in a first operating state.

An optical device 201 is embodied here as a zoom-setting device for a stereoscopic observing unit. The optical device 201 comprises a housing 202, in which a first guiding element 205 and, parallel thereto, a second guiding element 206 are mounted. Both guiding elements (205, 206) are configured as guiding rods. The two guiding elements (205, 206) run along an axial direction, which in this embodiment runs parallel to a first optical axis 203 of a first stereo channel. Arranged parallel to the first optical axis 203 of the first stereo channel is a second optical axis 204 of a second stereo channel. Mounted displaceably on the guiding elements (205, 206) in the direction of the two optical axes (203, 204) are a first slide element 210 and a second slide element 220. On the first slide element 210, a first optical element 215 is provided on the first optical axis 203 and a second optical element 216 is provided on the second optical axis 204. On the second slide element 220, a third optical element 225 is provided on the first optical axis 203 and a fourth optical element 226 is provided on the second optical axis 204. The slide element 210 is additionally connected to a setting wheel 209 by way of a drive rod 207, for example by thread engagement. Turning of the setting wheel 209 brings about turning of the drive rod 207. Turning of the drive rod 207 leads to a change in the working position of the first slide element 210 in the direction of the optical axes (203, 204). Consequently, the working position of the first slide element 210 in the axial direction can be set by way of the setting wheel 209.

A control cam element 240 is connected to the housing 202 in such a way that it is fixed in place. The control cam element 240 has a control cam contour 241 with respect to the two optical axes (203, 204). Provided on the first slide element 210 is a first bearing in the form of a first ball bearing 211 and provided on the second slide element 220 is a second bearing in the form of a second ball bearing 221. Between the first ball bearing 211, the second ball bearing 221 and the control cam contour 241 there is a coupling element 230. The coupling element 230 is connected to the first slide element 210 by way of an additional joint 231 with a translatory degree of freedom. The joint 231 is formed in this embodiment as a slotted link.

A force element, for example a tension spring 208, brings about a tensile force between the second slide element 220 and the first slide element 210. In this case, the coupling element 230, which is guided in an engaging recess of the two ball bearings (211, 221), is pressed against the control cam contour 241 without play.

The coupling element 230 has a first abutting contour 238, with which the coupling element 230 with the first ball bearing 211 is in contact by way of a first point 212. The coupling element 230 has a second abutting contour 239, with which the coupling element 230 with the second ball bearing 221 is in contact at a second point 222. A third point 232 is obtained as a contact point of the control cam contour 241 with the coupling element 230. The coupling element 230 has a first lever arm 233 between the first point 212 and the third point 232 and a second lever arm 234 between the second point 222 and the third point 232.

In FIG. 7, the optical adjusting device 201 according to the third embodiment is shown in a first operating state. The slide element 210 is in this state in a first working position, which may also be referred to here as the first end position, since the slide element 210 is against an end stop in relation to the housing 202. The position of the coupling element 230 is defined by the control cam contour 241, the first ball bearing 211 and the joint 231. Depending on the position of the coupling element 230, a first relative distance in relation to the first slide element 210 is established for the second ball bearing 221 and the second slide element 221 connected thereto. Consequently, the first optical element 215 and the third optical element 225 as well as the second optical element 216 and the fourth optical element 226 are in a first zoom setting.

In FIG. 8, the third embodiment of the adjusting device according to the invention is shown in a second operating state.

The slide element 210 is in this state arranged in a midway position between the two end positions. The position of the coupling element 230 is defined by the form of the control cam contour 241, the position of the ball bearing 211 provided on the slide element 210 and the position of the joint 231. The tension spring 108 (not shown in FIG. 8) has the effect that the second slide element 220 with the ball bearing 221 is drawn to the coupling element 230. As a result, a second relative distance between the first slide element 210 and the second slide element 220 is set. The first optical element 215 and the third optical element 225 as well as the second optical element 216 and the fourth optical element 226 are in a second zoom setting. This second zoom setting corresponds to a second operating state of the optical device 201.

In FIG. 9, the third embodiment of the adjusting device according to the invention is shown in a third operating state.

As a result of the control cam contour 241, a third relative distance is established between the first slide element 210, and the coupling element 230 connected thereto by way of the first ball bearing 211 and the joint 231, and the second slide element 220 by way of the ball bearing 221. The slide element 220 is in a second end position. The first optical element 215 and the third optical element 225 as well as the second optical element 216 and the fourth optical element 226 are consequently in a third zoom setting. This third zoom setting corresponds to a third operating state of the optical device 201.

In FIGS. 7, 8 and 9, the two lever arms (233, 234) are depicted as dashed lines in each of these figures. FIGS. 7 to 9 show the changes in the lengths of the first lever arm 233 and the second lever arm 234 in three different operating states of the optical adjusting device 201.

In the first operating state, represented in FIG. 7, the first lever arm 233 is formed shorter than the second lever arm 234. If a distance between a center point of the first ball bearing 211 and a center point of the second ball bearing 221 is defined as a first distance, the first lever arm 233 is shorter than this first distance and the second lever arm 234 is longer than this first distance. In the second operating state, according to FIG. 8, two lever arms (233, 234) have a similar length. The first lever arm 233 is longer in this second operating state than in the first operating state. The second lever arm 234 is shorter in the second operating state than in the first operating state according to FIG. 7. A movement of the optical adjusting device 201 from the first operating state into the second operating state has the result that the first lever arm 233 is extended in length and the second lever arm 234 is shortened. During the movement of the optical adjusting device 201 from the first operating state into the second operating state, the change in the length of the two lever arms (233, 234) takes place in a non-linear way.

In FIG. 9, a third operating state is shown. In the third operating state, the first lever arm 233 is formed shorter in relation to the second lever aim 234. During a movement of the optical adjusting device 201 from the second operating state into the third operating state, the first lever arm 233 and the second lever arm 234 are respectively shortened differently. The change in the length of the two lever arms (233, 234) is non-linear. In the case of a reversal of the direction of movement from the third operating state into the second operating state and from the second operating state into the first operating state, the changes in the length of the two lever arms (233, 234) are inverted.

A coupling element 230 of any desired form that is in contact with the two slide elements (210, 220) and the control cam contour 241 merely by way of the first point 212, the second point 222 and the third point 232 can in certain operating states of the optical adjusting device 201 perform an indeterminate movement of its own in the form of a rotation about an axis transversely in relation to the axial direction of the movement. The adding of an additional joint 231 with a translatory degree of freedom has the effect that a defined position of the coupling element 230 is ensured for every operating state. It is in this case possible to implement this joint 231 both between the first slide element 210 and the coupling element 230 and between the second slide element 220 and the coupling element 230.

The joint 231 is configured in this embodiment as a slotted link. A very simple slotted link can be achieved by a set-pin being guided in a slot. As a result of the forcible guidance of the joint 231, a possible movement of the coupling element 230 on its own is reliably suppressed in every working position. This affords advantages in the production of the coupling element 230. The first abutting contour 238 and/or the second abutting contour can be inexpensively embodied as a straight contour.

FIG. 10 shows a schematic of the optical elements in three operating states according to the three embodiments. The working positions of the optical elements of a single stereo subchannel with respect to an optical axis 301 are each shown. In a first operating state 300, a zoom factor of "0.5" is set; in a second operating state 320, the zoom factor is "1" and, in a third operating state 340, the zoom factor "2" is set. FIG. 10 shows a working position of the first displaceable optical element 304 and the second displaceable optical element 305 according to the three embodiments. The two displaceable optical elements (304, 305) are each arranged displaceably between the two unadjustable optical elements 302 and 303 with respect to the optical axis 301.

In addition to the three operating states (300, 320, 340), all possible operating states in between can be set in an infinitely variable manner. The two position allocation lines (310, 311) show the relative movement of the two displaceable optical elements (304, 305) in relation to one another in every possible operating state. The position allocation line 310 shows the assignment of the working position of the first optical element 304 for each zoom factor that can be set between 0.5 and 2. The position allocation line 311 shows the corresponding allocation of the working position of the second optical element 305 for these zoom factors. The two position allocation lines (310, 311) clearly show that the movement sequence of the two displaceable optical elements (304, 305) follows a non-linear progression when running through all of the possible operating states. In addition, the relative distance of the second displaceable optical element 305 in relation to the first displaceable optical element 304 is dependent on the corresponding working position of the first displaceable optical element 304.

The zoom factors represented here of 0.5, 1 and 2 are given by way of example. It is consequently also possible to cover every other zoom range by the optical adjusting device (1, 101, 201).

With the optical adjusting device (1, 101, 201), it is possible to move two optical elements (15, 25, 115, 125, 215, 225, 304) or (16, 26, 116, 126, 216, 226, 305), which may comprise optical lenses or groups of optical lenses, in relation to one another along the optical axes (3, 4, 103, 104, 203, 204, 301). Common applications are formed by zoom systems of optical systems, for example telescopes, microscopes or other observing devices. These optical systems may be embodied as monoocular or stereoscopic. A particular embodiment is formed by what is known as a miniscope, a very small embodiment of a stereo microscope that can be provided on a user's head.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Optical device
2 Housing
3 First optical axis
4 Second optical axis
5 First guiding element
6 Second guiding element
7 Drive rod
8 Tension spring
9 Setting wheel
10 First slide element
11 First bearing/first ball bearing
12 First point
15 First optical element
16 Second optical element
20 Second slide element
21 Second bearing/second ball bearing
22 Second point
25 Third optical element
26 Fourth optical element
30 Coupling element
32 Third point
33 First lever arm
34 Second lever arm
40 Control cam element
41 Control cam contour
101 Optical device
102 Housing
103 First optical axis
104 Second optical axis
105 First guiding element
106 Second guiding element
107 Drive rod
108 Tension spring
109 Setting wheel
110 First slide element
111 Bearing device
112 First point
115 First optical element
116 Second optical element
120 Second slide element
121 Bearing
122 Second point
125 Third optical element
136 Fourth optical element
130 Coupling element
132 Third point
133 First lever arm
134 Second lever arm
140 Control cam element
141 Control cam contour
201 Optical device
202 Housing
203 First optical axis
204 Second optical axis
205 First guiding element
206 Second guiding element
207 Drive rod
208 Tension spring
209 Setting wheel
210 First slide element
211 First bearing/first ball bearing
212 First point
215 First optical element
216 Second optical element
220 Second slide element
221 Second bearing/second ball bearing
222 Second point
230 Coupling element
231 Joint
232 Third point
233 First lever arm
234 Second lever arm
238 First abutting contour of the coupling element 230
239 Second abutting contour of the coupling element 230
240 Control cam element
241 Control cam contour
250 Control cam element
251 Toothed control cam contour
252 Coupling element
253 Toothed cam contour
300 First operating state
301 Optical axis
302 First unadjustable optical element
303 Second unadjustable optical element
304 First displaceable optical element
305 Second displaceable optical element
310 Position allocation line of the first displaceable optical element 304
311 Position allocation line of the second displaceable optical element 305
320 Second operating state
340 Third operating state

What is claimed is:
1. An adjusting device for an optical system, the adjusting device comprising:
a first slider for a first optical element and said first slider being arranged so as to be displaceable along an axial direction;

a second slider for a second optical element and said second slider being arranged so as to be displaceable along said axial direction;

a control element defining a control cam contour and being fixedly mounted relative to said axial direction;

a coupler configured as a single part and being arranged between said first slider, said second slider and said control cam contour;

a force element applying a force between said first and said second sliders so as to cause said coupler to be in contact with said first slider at a first point and with said second slider at a second point and with said control cam contour at a third point;

said coupler including a first lever arm formed between said first point and said third point and a second lever arm formed between said second point and said third point; and, said device being so configured that, with a movement of said coupler, at least one of said first and second lever arms is changeable with respect to the length thereof.

2. The adjusting device of claim 1, wherein said first slider, said second slider and said coupler have respective contours; said contour of said first slider, said contour of said second slider, said contour of said coupler and said contour of said control element are mutually matched so as to cause a resistance to movement between said coupler and said control cam contour to be greater than a sum of resistances to movement between said first slider and said coupler as well as between said second slider and said coupler so that said coupler rolls off along said control cam contour during a movement.

3. The adjusting device of claim 1, wherein said first slider has a first bearing unit which is configured so as to cause said first slider to be in contact with said coupler at said first contact point via said first bearing point.

4. The adjusting device of claim 3, wherein said second slider has a second bearing unit which is configured so as to cause said second slider to be in contact with said coupler at said second contact point via said bearing unit.

5. The adjusting device of claim 4, wherein said coupler has, at least in part, a round contour surface configured so as to cause said coupler via said contour surface thereof to be in contact with said first slider at said first point in all operating states of said adjusting device and to be in contact via said contour surface thereof with said second slider at said second point.

6. The adjusting device of claim 1, further comprising a toothed connection for connecting said coupler to said control cam contour.

7. The adjusting device of claim 1, wherein said coupler is connected to said first slider via a rotary joint and said first point is formed by said rotary joint.

8. The adjusting device of claim 1, wherein said coupler and said first slider are connected to each other by a joint having a translatory degree of freedom.

9. The adjusting device of claim 8, wherein said joint is configured with a pin guided in a slot.

10. The adjusting device of claim 9, wherein said coupler has at least one straight abutting contour so as to permit said coupler to be in contact in all operating states of said adjusting device at said straight abutting contour with said first slider at said first point.

11. The adjusting device of claim 1, wherein said force element is configured as a tension spring.

12. An adjusting device for an optical system, the adjusting device comprising:

a first slider for a first optical element and said first slider being arranged so as to be displaceable along an axial direction;

a second slider for a second optical element and said second slider being arranged so as to be displaceable along said axial direction;

a control element defining a control cam contour and being fixedly mounted relative to said axial direction;

a coupler configured as a single part and being arranged between said first slider, said second slider and said control cam contour;

a force element applying a force between said first and said second sliders so as to cause said coupler to be in contact with said first slider at a first point and with said second slider at a second point and with said control cam contour at a third point;

said coupler including a first lever arm formed between said first point and said third point and a second lever arm formed between said second point and said third point;

said device being so configured that, with a movement of said coupler, at least one of said first and second lever arms is changeable with respect to the length thereof; and, said coupler having, at least in part, a round contour surface configured so as to cause said coupler via said contour surface thereof to be in contact with said first slider at said first point in all operating states of said adjusting device and to be in contact via said contour surface thereof with said second slider at said second point.

13. An adjusting device for an optical system, the adjusting device comprising:

a housing;

first and second mutually parallel guides extending in an axial direction;

a first slider for a first optical element and said first slider being mounted on said first and second guides so as to be displaceable in said axial direction;

a second slider for a second optical element and said second slider being mounted on said first and second guides so as to be displaceable in said axial direction;

a setting device operatively connected to said first slider for moving said first slider along said guides in said axial direction to bring said first slider into a desired working position;

a control element defining a control cam contour and being fixedly mounted relative to said axial direction;

a coupler configured as a single part and being arranged between said first slider, said second slider and said control cam contour;

a biasing device for applying a biasing force between said first and said second sliders tending to draw said first and second sliders toward each other and causing said coupler to be in contact with said first slider at a first point and with said second slider at a second point and with said control cam contour at a third point so as to set a new distance of said second slider relative to said first slider;

said coupler including a first lever arm formed between said first point and said third point and a second lever arm formed between said second point and said third point; and, said device being so configured that, with a movement of said coupler, at least one of said first and second lever arms is changeable with respect to the length thereof.

14. The adjusting device of claim 13, wherein said first slider, said second slider and said coupler have respective contours; said contour of said first slider, said contour of said second slider, said contour of said coupler and said contour of said control element are mutually matched so as to cause a resistance to movement between said coupler and said control cam contour to be greater than a sum of resistances to movement between said first slider and said coupler as well as between said second slider and said coupler so that said coupler rolls off along said control cam contour during a movement.

15. The adjusting device of claim 13, wherein said first slider has a first bearing unit which is configured so as to cause said first slider to be in contact with said coupler at said first contact point via said first bearing point.

16. The adjusting device of claim 15, wherein said second slider has a second bearing unit which is configured so as to cause said second slider to be in contact with said coupler at said second contact point via said bearing unit.

17. The adjusting device of claim 16, wherein said coupler has, at least in part, a round contour surface configured so as to cause said coupler via said contour surface thereof to be in contact with said first slider at said first point in all operating states of said adjusting device and to be in contact via said contour surface thereof with said second slider at said second point.

18. The adjusting device of claim 13, wherein said coupler has, at least in part, a round contour surface configured so as to cause said coupler via said contour surface thereof to be in contact with said first slider at said first point in all operating states of said adjusting device and to be in contact via said contour surface thereof with said second slider at said second point.

19. The adjusting device of claim 13, further comprising a toothed connection for connecting said coupler to said control cam contour.

20. The adjusting device of claim 13, wherein said biasing device is configured as a tension spring.

* * * * *